United States Patent
Lake et al.

(10) Patent No.: US 7,082,607 B2
(45) Date of Patent: Jul. 25, 2006

(54) REDUCED-OVERHEAD CONTEXT-SAVING IN STATIC PRIORITY SCHEDULED OPERATING SYSTEMS

(75) Inventors: David Lake, Malton (GB); John Tuffen, York (GB)

(73) Assignee: Livedevices Limited (GB)

( * ) Notice: Subject to any disclaimer, the term of this patent is extended or adjusted under 35 U.S.C. 154(b) by 729 days.

(21) Appl. No.: 10/146,654

(22) Filed: May 14, 2002

(65) Prior Publication Data

US 2003/0204554 A1 Oct. 30, 2003

(30) Foreign Application Priority Data

Apr. 25, 2002 (GB) ................... 0209479.5

(51) Int. Cl.
*G06F 9/46* (2006.01)
*G06F 12/00* (2006.01)
*G06F 7/38* (2006.01)
*G06F 11/00* (2006.01)

(52) U.S. Cl. .............. 718/107; 712/228; 710/200; 710/244; 714/10

(58) Field of Classification Search ............ 712/228; 718/100–108; 714/10; 710/200–244
See application file for complete search history.

(56) References Cited

U.S. PATENT DOCUMENTS

| 5,799,188 A | | 8/1998 | Manikundalam et al. |
| 5,911,065 A | * | 6/1999 | Williams et al. ............ 718/102 |
| 5,949,994 A | * | 9/1999 | Dupree et al. .............. 712/228 |

(Continued)

FOREIGN PATENT DOCUMENTS

| EP | 0-052-713 A2 | * | 9/1981 |
| EP | 0 558 926 | | 9/1993 |
| JP | 05127926 | * | 5/1993 |

OTHER PUBLICATIONS

Corbett, "Timing Analysis of ADA Tasking Programs", 1996, IEEE, Transactions on Software Engineering, vol. 22, No. 7, pp. 461-483.*

(Continued)

*Primary Examiner*—Meng-Al T. An
*Assistant Examiner*—Jennifer N. To
(74) *Attorney, Agent, or Firm*—Sheridan Ross P.C.

(57) ABSTRACT

There are disclosed methods, computing devices and software products that seek to reduce memory/processor overheads in static priority scheduled operating systems by reducing the number of resource contexts that need to be saved and restored when running a plurality of tasks. This may be achieved by forming mutually-exclusive non-preemption groups of tasks, and/or by determining which tasks share a common resource.

18 Claims, 1 Drawing Sheet

U.S. PATENT DOCUMENTS

Figure 1:
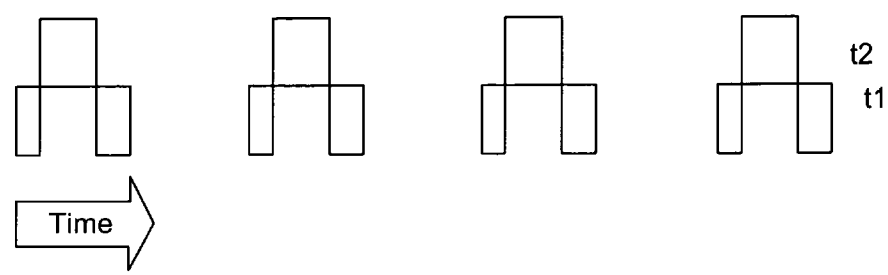

| | | | |
|---|---|---|---|
| 5,954,792 A * | 9/1999 | Balarin | 718/102 |
| 6,052,707 A | 4/2000 | D'Souza | |
| 6,061,709 A * | 5/2000 | Bronte | 718/103 |
| 6,324,678 B1 | 11/2001 | Dangelo et al. | 716/18 |
| 6,343,338 B1 * | 1/2002 | Reneris | 710/200 |
| 6,427,162 B1 * | 7/2002 | Mohamed | 718/108 |
| 6,438,573 B1 * | 8/2002 | Nilsen | 718/100 |
| 6,721,948 B1 * | 4/2004 | Morgan | 718/102 |
| 6,823,472 B1 * | 11/2004 | DeKoning et al. | 714/10 |
| 2001/0049781 A1 * | 12/2001 | Miyake et al. | 712/228 |
| 2002/0049802 A1 * | 4/2002 | Nakahara et al. | 709/103 |
| 2002/0133530 A1 * | 9/2002 | Koning | 709/102 |
| 2002/0138679 A1 * | 9/2002 | Koning et al. | 710/244 |

OTHER PUBLICATIONS

Kim et al., "Intergrating Real-Time Synchronization Schemes into Preemption Threhold Scheduling", 2002, IEEE, pp. 1-8.*

Davis et al.; "How Embedded Applications using an RTOS can stay within On-chip Memory Limits"; Proceedings of the Work in Progress and Industrial Experience Session, Euromicro Conference on Real-Time Systems, Jun. 2000.

Saksena et al.: "Scalable Real-Time System Design using Preemption Thresholds": The 21$^{st}$ IEEE Real-Time Systems Symposium, 2000. Proceedings, pp. 25-34.

Clement et al.; "Scheduling High-Level Tasks among Cooperative Agents"; 1998 IEEE; pp. 96-103.

* cited by examiner

REDUCED-OVERHEAD CONTEXT-SAVING IN STATIC PRIORITY SCHEDULED OPERATING SYSTEMS

The present invention relates to methods and systems for reducing memory and processor usage in operating systems that make use of static priority-based scheduling, specifically, in reducing the need for resource saving on inter-task context switches. Embodiments of the present invention are of particular relevance to the technical field of embedded devices and the control thereof, since these generally use static priority-based scheduling given the limited range of functions required.

In an operating system that is based around static priority based scheduling (systems in which the priority ordering of tasks is determined offline and remains constant) there exists some external description of the tasking structure of the system that is used to generate data structures describing the tasks and their priorities. These data structures are most advantageously calculated offline by a "configuration tool" or other program and used to initialize the system when it starts up. Tasks in such an operating system may be activated at any time, but do not start to run until they are the highest-priority runnable task in the system. They continue to run (though they may be pre-empted by other higher-priority tasks at which point a context-switch takes place) until their work is done and then terminate.

Applications built using such operating systems typically consist of a plurality of concurrent tasks each set at a predetermined priority. Embodiments of the present invention relate to reducing the amount of context that needs to be saved when making a context switch between any two tasks.

The present invention is described in terms of its application to an operating system with single-stack, single-shot, run-to-completion task semantics though is generally applicable to other forms of tasking model.

Consider a system that makes use of any software or hardware resource which must "appear" to each task to be under its exclusive control (for example, a non-reentrant software floating point implementation; a set of hardware floating-point registers; or a set of digital signal processor accumulators). We refer to the collection of data that must be loaded and saved in order to give each task its own view of such resources as a "resource context", since this is additional to the normal task context.

In a conventional system, these resources would be saved on entry to any task and restored when the task exits. This means that for any system there would be an additional memory usage of one "resource context" per task in the system.

According to a first aspect of the present invention, there is provided a method of reducing memory or processor usage in an operating system that uses static priority-based scheduling for tasks, wherein a reduced number of resource contexts required by the operating system is calculated by determining which tasks make use of resource contexts that must be saved and restored and wherein wrappers or dispatchers are provided for tasks that must save and restore such resource contexts.

According to a second aspect of the present invention, there is provided a computing device having an operating system that uses static priority-based scheduling for tasks, the computing device being operable to calculate a reduced number of resource contexts required by the operating system by determining which tasks make use of resource contexts that must be saved and restored, and wherein the computing device provides wrappers or dispatchers for tasks that must save and restore such resource contexts.

According to a third aspect of the present invention, there is provided a software product for use with a computing device having an operating system that uses static priority-based scheduling for tasks, the software product being operable to calculate a reduced number of resource contexts required by the operating system by determining which tasks make use of resource contexts that must be saved and restored, and wherein the software product provides wrappers or dispatchers for tasks that must save and restore such resource contexts.

Preferably, it is also determined which tasks will never run together (i.e. which tasks can be determined to be in mutual exclusion, thus forming a mutually exclusive non-pre-emption group of tasks), either by timing analysis or by schedulability analysis so as further to reduce the number of resource contexts required.

The software product may be in any appropriate form or language, and may be stored on a data carrier such as a floppy disk, optical disk, flash memory device or any other type of data carrier.

We shall first discuss the meaning of "wrapper" and "dispatcher" as used subsequently in the present application before discussing potential implementations of embodiments of the invention.

A "wrapper" in this application is defined to be a fragment of program code that encapsulates a task and is called in its place by the underlying operating system—for example, if we consider a task "task_1" whose "entry" (the function that carries out useful work) is defined as follows:

```
void task_1_entry(void)
{
    /* do lots of useful work */
}
``` we may under some circumstances (for example if loading or saving of context is required) wish to replace it with a wrapper:

```
void task_1_entry_wrapper (void)
{
    do_stuff_that_must_be_done_before_calling_task( )
    task_1_entry( );
    do_stuff_that_must_be_done_after_running_task( );
}
```

A "dispatcher" performs essentially the same activities, but rather than the task entry function being replaced, the operating system itself is modified to make the pre- and post-task calls. For example, we might find the following code inside the operating system:

```
void os_dispatcher(void)
{
    task *t = os_find_highest_priority_runnable_task( );
    if (t->priority> os_current_task->priority) {
        do_stuff_that_must_be_done_before_calling_task( );
        t->entry( );
        do_stuff_that_must_be_done_before_calling_task( );
    }
}
```

The description of this invention concentrates on the use of wrappers although an approach similar to this but using modified forms of the operating system dispatch function is also possible.

Let us consider an example of an unoptimised configuration of a system that uses task wrappers. Let us assume that a system is declared as follows (where higher numbers imply higher priority):

```
task a priority 1;
task b priority 2;
task c priority 3;
task d priority 4;
task e priority 5;
```

Trivially, this system would require five "resource contexts"—one for each of tasks a, b, c, d and e to save their resources into when they are pre-empted by higher priority tasks. Each task would be protected by a "wrapper" that ensures that the "resource context" would be saved into the appropriate buffer and the operating system dispatcher would call this instead of the task entry function—for example, instead of jumping direct to "task_d_entry" the system dispatcher would call a wrapper:

```
resource_context rc;
void task_d_entry_wrapper(void)      /* Generated by config tool */
{
  save_context(&rc);         /* save context */
  task_d_entry( );           /* call entry */
  restore_context(&rc);      /* restore context */
}
```

(in this case we show the wrapper being generated in a C-like language and including the declaration of the "resource context" itself—though this could also be generated in assembly language with appropriate code and data declarations, or could be brought about by calling different variants or branches of the operating system dispatcher function).

The system dispatcher in this case could use a table of function pointers to decide which function to call for each task. In a hypothetical assembly language this might appear as below:

```
task_entry_tab: PUBLIC
        .pointer task_a_entry_wrapper
        .pointer task_b_entry_wrapper
        .pointer task_c_entry_wrapper
        .pointer task_d_entry_wrapper
        .pointer task_e_entry_wrapper
```

But let us assume that only three of the tasks make use of resources that must be saved and restored—the system description is modified to:

```
task a priority 1 uses fp;
task b priority 2 uses fp;
task c priority 3;
task d priority 4 uses fp;
task e priority 5;
```

In this system, the "uses fp" declaration is added to indicate that a task uses the floating-point coprocessor. If a task does not explicitly mention that it uses something that requires a "resource context", then one is not provided (and no wrapper is needed—the OS can call the task's entry function directly).

A logical implication of the above is that the lowest-priority task that uses a shared resource need not provide a wrapper to load or save that context—since the pre-empter saves the context rather than the pre-emptee. The ultimate extension of this is that any system in which only one task uses a shared resource needs no wrapper or storage as there is nothing else that uses the resource to pre-empt it.

This means that only two resource contexts and wrappers need be generated (for task b and task d). In this case the dispatch table might look like this:

```
task_entry_tab: PUBLIC
        .pointer task_a_entry # no need for wrapper - preemptor saves
        .pointer task_b_entry_wrapper # needs wrapper, can pre-empt a
        .pointer task_c_entry # no need for wrapper - no FP
        .pointer task_d_entry_wrapper # needs wrapper, can pre-empt b
        .pointer task_e_entry # no need for a wrapper
```

A further optimization can be made to this. Suppose we have a mechanism for declaring that two tasks execute in mutual exclusion to each other (i.e. a for a pair of tasks x and y, even though x is of higher priority than y, x can never pre-empt y).

Consider this system description that places tasks a and b in mutual exclusion:

```
task a priority 1 uses fp;
task b priority 2 uses fp;
task c priority 3;
task d priority 4 uses fp;
task e priority 5;
mutex a, b;
```

Given that tasks a and b are in mutual exclusion, we can therefore remove another resource context and wrapper—only task d needs to save and restore the "resource context" since it is the only higher-priority task that may affect the state of the shared resources, so in this case only task d would be generated with a wrapper and a "resource context".

It is to be noted that when tasks or the like share the same priority, they can be treated in the same way as if they are in mutual exclusion.

Consider also this variant:

```
task a priority 1 uses fp;
task b priority 2;
task c priority 3 uses fp;
task d priority 4 uses fp;
task e priority 5;
mutex c, d;
```

In this system, it is clear that both tasks c and d need a wrapper to save the context, but since they are in mutual exclusion they can share the same resource context. The wrappers might be of the form:

resource_context rc_c_and_d;

```
void task_c_entry_wrapper(void)      /* Generated by config tool */
{
  save_context(&rc_c_and_d);         /* save context*/
```

-continued

```
task_c_entry( );                    /* call entry */
restore_context(&rc_c_and_d);       /* restore context */
}
void task_d_entry_wrapper(void)     /* Generated by config tool */
{
  save_context(&rc_c_and_d);        /* save context*/
  task_d_entry( );                  /* call entry */
  restore_context(&rc_c_and_d);     /* restore context */
}
```

Although we discuss only tasks in this description, this scheme is uniformly extensible to Interrupt Service Routines provided that we can determine interrupt priority ordering—so any ISR that uses a particular resource would need to save and restore that resource if it could be interrupted by another higher-priority interrupt. (Interrupts at the same priority but at a different arbitration order would be considered to be in a mutual exclusion group).

An algorithm that could be used by an offline configuration tool for determining resource contexts and wrappers might be as follows:

```
global list of task Tasks;
global list of mutex Mutexes;
-- Preconditions: Mutexes is a list of all mutexes in the system
-- Tasks is a list of tasks sorted into priority order.
procedure Generate_Contexts is
  list of context Resource_Contexts = nil;
  list of wrapper Wrappers = nil;
  -- Phase 1. Generate unique wrapper and context for every task
  -- that locks the resource. Point the context at the wrapper.
  for t in Tasks do
    if uses_shared_resource(t) then
      wrapper w = new Wrapper(t); append(w, Wrappers);
      context c = new Context(t); append (c, Contexts);
      wrapper_set_context(c,w);
    end if;
  end for;
  -- Phase 2. Merge all contexts that can be merged, and
  -- amend the wrappers to point to these merged contexts.
  -- Delete any contexts that we don't use any more.
  for t in Tasks do
    for u in Tasks do
      -- merge if t & u wrapped but exist in a mutex
      if t <> u and exists_wrapper(Wrappers, t)
        and exists_wrapper(Wrappers, u)
        and exists_mutex(t,u) then
        -- get the wrappers for the tasks.
        w = get_wrapper(Wrappers, t);
        x = get_wrapper(Wrappers, u);
        -- get the contexts for the tasks.
        c1 = get_context(t);
        c2 = get_context(u);
        -- make a new context that combines both existing ones.
        c3 = new Context (merge_context(c1, c2));
        append(c3, Contexts);
        -- get rid of the old contexts.
        delete_context(Contexts, c1);
        delete_context(Contexts, c2);
        -- point the wrappers at the new context.
        wrapper_set_context(w, c3);
        wrapper_set_context(x, c3);
      end if;
    end for;
  end for;
  -- phase 3. The lowest-priority task using the resource
  -- AND ANYTHING IN A MUTEX WITH IT
  -- (which means anything sharing the same context) will NOT need
  -- a wrapper or a context.
  w = head Wrappers;
  first_wrapped_task = get_task(w);
  c = get_context(first_wrapped_task);
  for t in tasks do
    w = get_wrapper(t);
    if get_context(t) = c then
      delete_wrapper(Wrappers, w);
    end if;
  end for;
  delete_context(Contexts, c);
end procedure;
```

It will be appreciated that this algorithm is merely an example of a way to determine resource contexts; embodiments of the present invention may use this algorithm or any other appropriate algorithm or method that achieves the same or a similar effect.

A simple extension of this approach would allow each device to use multiple shared resources, with optimal wrappers being generated for each task based on the resource(s) it uses—for example consider the following system which has floating point registers and a digital signal processor (DSP) unit:

task a priority 1 uses fp;
task b priority 2 uses dsp, fp:
task c priority 3 uses fp;
task d priority 4 uses dsp;
task e priority 5 uses dsp, fp;
task f priority 6 uses fp;

In this system:

Task a needs no wrapper (since the pre-empter saves the resources)

Task b needs a wrapper that saves only the "fp" context (it is the lowest priority task that uses the "dsp" context, so does not need to save it)

Task c needs a wrapper that saves only the "fp" context

Task d needs a wrapper that saves only the "dsp" context (it is the first pre-empting task to use it)

Task e needs a wrapper that saves both contexts

Task f needs a wrapper that saves only the "fp" context.

Such wrappers can be automatically generated from code skeletons provided by the user of the configuration tool.

According to a fourth aspect of the present invention, there is provided a method of integrating results from a timing analysis tool with an operating system configuration tool in such a way that when it is shown by the timing analysis tool that a particular task never pre-empts another task or tasks with which it contends for a resource, only a single resource context is generated, the single resource context being shared by the tasks.

According to a fifth aspect of the present invention, there is provided a computing device adapted to integrate results from a timing analysis tool with an operating system configuration tool in such a way that when it is shown by the timing analysis tool that a particular task never pre-empts another task with which it contends for a resource, only a single resource context is generated, the single resource context being shared by the tasks.

According to a sixth aspect of the present invention, there is provided a software product for a computing device, the software product being adapted to integrate results from a timing analysis tool with an operating system configuration tool in such a way that when it is shown by the timing analysis tool that a particular task never pre-empts another task with which it contends for a resource, only a single resource context is generated, the single resource context being shared by the tasks.

In other words, the results of a timing analysis, which maybe heuristic in nature, can be used in place of or in addition to results from a formal schedulability analysis so as to designate tasks as being effectively in mutual exclusion. In this way, duplication of resource contexts and/or wrappers is avoided.

It is to be noted that a timing analysis may be obtained by way of a timing analysis tool that applies techniques such as Rate Monotonic Analysis and extensions thereof in order to determine, among other things, when a given task might be executing, the latest time at which the given task might complete, and which other tasks can possibly pre-empt the given task.

Take for example the following simple periodic system:
 task t1 priority 1 every 20 ticks duration 5 ticks offset 0 ticks uses fp;
 task t2 priority 2 every 20 ticks duration 5 ticks offset 2 ticks uses fp;

The execution profile of this system is shown in FIG. 1 of the accompanying drawings. In this system, task t2 will always pre-empt task t1 two "ticks" into its run, the system returning to task t1 after t2 has finished running after five "ticks". Since both tasks share use of the floating point registers, task t2 must therefore load and save their context.

Figure 2:
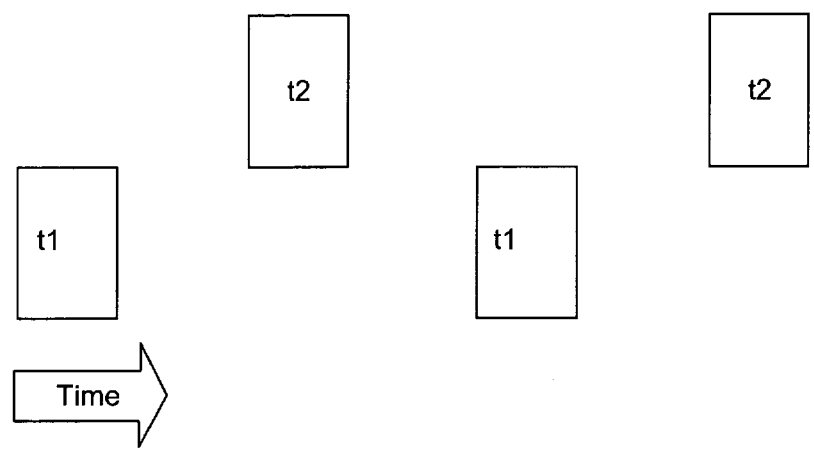

Consider, though, the following system:
 task t1 priority 1 every 20 ticks duration 5 ticks offset 0 ticks uses fp;
 task t2 priority 2 every 20 ticks duration 5 ticks offset 10 ticks uses fp;

The execution profile of this system is shown in FIG. 2 of the accompanying drawings. In this system, task t2 never pre-empts task t1—it is therefore legitimate for a timing analysis tool to infer that the tasks can execute in mutual exclusion and by automatically adding the declaration
 mutex t1, t2; to the system declaration this can inhibit the generation of wrappers and context-save information for these two tasks.

The approach is extensible to any form of analysis that can demonstrate that for any pair of tasks x, y, there exists no condition in which the tasks can pre-empt each other.

For example, a published prior art paper entitled: "How embedded applications using an RTOS can stay within on-chip memory limits" [Robert Davis, Nick Merriam, and Nigel Tracey; *Proceedings of the Work in Progress and Industrial Experience Session, Euromicro Conference on Real-Time Systems*, June 2000.] shows how schedulability analysis can be used to collect tasks into mutexes while ensuring that all task deadlines are met. It is simple to extend these techniques so that mutex creation minimises the combination of stack size and context save areas by grouping into mutexes those tasks which would otherwise require separate context save areas.

The invention claimed is:

1. A method of reducing memory or processor usage in an operating system that uses static priority-based scheduling for tasks, wherein for a particular resource, data for corresponding resource contexts required by the operating system is determined by a step of determining which of the tasks require resource contexts to be saved and restored for use of the particular resource, wherein wrappers or dispatchers are provided for the tasks that must save and restore such resource context; and
 wherein said step of determining is dependent upon one or more of: (a) identifying one of the tasks having a lowest priority for the particular resource, and (b) identifying one of the tasks whose use of the particular resource is mutually exclusive of uses of the particular resource by another of the tasks.

2. A method according to claim 1, wherein it is determined which of the tasks will never run together, by way of one of: (a) a timing analysis or a schedulability analysis of the operating system description,or (b) a timing analysis so as further to reduce the number of resource contexts required.

3. A method according to claim 2, wherein the tasks include Interrupt Service Routines.

4. A method according to claim 1, wherein the tasks include Interrupt Service Routines.

5. A computing device having an operating system that uses static priority-based scheduling for tasks, the computing device being operable to calculate, for a particular resource, data for corresponding resource contexts required by the operating system, wherein a determination is made as to which of the tasks require resource contexts to be saved and restored for use of the particular resource, and wherein the computing device provides wrappers or dispatchers for the tasks that must save and restore such resource contexts; and
 wherein in determining which of the tasks require resource contexts to be saved and restored, one or more of the following are identified: (a) one of the tasks having a lowest priority for the particular resource, and (b) one of the tasks whose use of the particular resource is mutually exclusive of uses of the particular resource by another of the tasks.

6. A device as claimed in claim 5, the computing device being operable to determine which of the tasks will never run together by way of one of: a timing analysis or a schedulability analysis so as further to reduce the number of resource contexts required.

7. A device as claimed in claim 6, wherein the tasks include Interrupt Service Routines.

8. A device as claimed in claim 5, wherein the tasks include Interrupt Service Routines.

9. A software product for use with a computing device having an operating system that uses static priority-based scheduling for tasks, the software product being operable to calculate, for a particular resource, data for corresponding resource contexts required by the operating system, wherein a determination is made as to which of the tasks require resource contexts to be saved and restored for use of the particular resource, and wherein the software product provides wrappers or dispatchers for the tasks that must save and restore such resource contexts; and
 wherein in determining which of the tasks require resource contexts to be saved and restored, one or more of the following are identified: (a) one of the tasks having a lowest priority for the particular resource, and (b) one of the tasks whose use of the particular resource is mutually exclusive of uses of the particular resource by another of the tasks.

10. A software product as claimed in claim 9, the software product being operable to determine which of the tasks will never run together by way of one of: a timing analysis or a schedulability analysis so as further to reduce the number of resource contexts required.

11. A software product as claimed in claim 10, wherein the tasks include Interrupt Service Routines.

12. A software product as claimed in claim 9, wherein the tasks include Interrupt Service Routines.

13. A method of integrating results from a timing analysis tool with an operating system configuration tool, comprising:
first determining by the timing analysis tool that a particular operating system task of a plurality of operating system tasks never pre-empts a second of the operating system tasks with which it contends for a resource used by the operating system;
generating only a single resource context, the single resource context being shared by the particular and second tasks; and
second determining, for at least one resource used by the operating system, data for corresponding resource contexts required by the operating system, wherein the data is determined by calculating which of the operating system tasks require resource contexts to be saved and restored for use of the at least one resource;
wherein said step of second determining is dependent upon one or more of: (a) identifying one of the operating system tasks having a lowest priority for the at least one resource, and (b) identifying one of the operating system tasks whose use of the at least one resource is mutually exclusive of uses of the at least one resource by another of the operating system tasks.

14. A method according to claim 13, wherein the plurality of operating system tasks include Interrupt Service Routines.

15. A computing device adapted to integrate results from a timing analysis tool with an operating system configuration tool, comprising:
a timing analysis tool that determines that a particular operating system task of a plurality of operating system tasks never pre-empts a second of the operating system tasks with which the particular operating system task contends for a resource used by the operating system; and
an operating system configuration tool for generating only a single resource context, the single resource context being shared by the particular and second tasks; and
wherein in determining which of the operating system tasks require resource contexts to be saved and restored for at least one of the least one of the operating system tasks, one or more of the following are identified: (a) one of the operating system tasks having a lowest priority for the at least one resource, and (b) one of the operating system tasks whose use of the at least one resource is mutually exclusive of uses of the at least one resource by another of the operating system tasks.

16. A device as claimed in claim 15, wherein the plurality of operating system tasks include Interrupt Service Routines.

17. A software product for a computing device, the software product being adapted to integrate results from a timing analysis tool with an operating system configuration tool, comprising:
a timing analysis tool that determines that a particular operating system task of a plurality of operating system tasks never pre-empts a second of the operating system tasks with which the particular operating system task contends for a resource used by the operating system; and
an operating system configuration tool for generating only a single resource context, the single resource context being shared by the tasks;
wherein in determining which of the operating system tasks require resource contexts to be saved and restored for at least one of the least one of the operating system tasks, one or more of the following are identified: (a) one of the operating system tasks having a lowest priority for the at least one resource, and (b) one of the operating system tasks whose use of the at least one resource is mutually exclusive of uses of the at least one resource by another of the operating system tasks.

18. A software product as claimed in claim 10, wherein the plurality of operating system tasks include Interrupt Service Routines.

* * * * *

UNITED STATES PATENT AND TRADEMARK OFFICE
CERTIFICATE OF CORRECTION

PATENT NO. : 7,082,607 B2
APPLICATION NO. : 10/146654
DATED : July 25, 2006
INVENTOR(S) : David Lake It is certified that error appears in the above-identified patent and that said Letters Patent is hereby corrected as shown below:

Column 10
Line 38, please insert the following Claims:
-- 19. The method of Claim 1, wherein the step (b) includes identifying one of the tasks that is not interruptible for the particular resource.

20. The method of Claim 1, both steps (a) and (b) are performed.

21. The computing device of Claim 3, wherein one of the tasks having a lowest priority for the particular resource is identified when determining which of the tasks require resource contexts to be saved and restored.

22. The computing device of Claim 21, wherein one of the tasks is identified whose use of the particular resource is mutually exclusive of uses of the particular resource by another of the tasks. --

Signed and Sealed this

Thirtieth Day of January, 2007

JON W. DUDAS
*Director of the United States Patent and Trademark Office*